Patented Feb. 6, 1934

1,946,333

UNITED STATES PATENT OFFICE 1,946,333

PROCESS FOR THE PRODUCTION OF RUBBER MIXTURES

Bruno Rewald, Hamburg, Germany, assignor to Hanseatische Muhlenwerke Aktiengesellschaft, Hamburg, Germany No Drawing. Application October 8, 1931, Serial No. 567,763, and in Germany November 20, 1930

19 Claims. (Cl. 18—53)

The invention concerns a process for the production of rubber mixtures and the like.

In the treatment of rubber for the production of soft rubber goods and the like, it is sometimes necessary, besides the usual addition such as sulphur, filling materials, pigments and the like, to incorporate softening material in order to facilitate the working, to render the rubber sufficiently plastic and to attain the desired mechanical strength.

Simultaneously, in order to shorten the vulcanization period vulcanization accelerators are added. It is known that purified rubber is vulcanized only with great difficulty, and that the materials accelerating vulcanization, in particular the protein materials and the like, are to be found in the impurities of the rubber.

I have now made the surprising discovery, that the phosphatides occurring in animal and vegetable materials are useful softening materials and good vulcanization accelerators for rubber and that these materials considerably improve the quality of the rubber product. Even an addition of about 0.4% of vegetable phosphatide to the rubber mixture is suitable to obtain the desired action and to attain a shortening of the vulcanization period.

For carrying out the process according to the invention phosphatides of any kind of animal and vegetable origin may be employed. In particular, for this purpose, the vegetable phosphatide which is obtained from soya beans is suitable. Also the phosphorus-containing by-products (which may contain partially decomposed lecithin) from soya oil manufacture may be employed.

It has been found that this material also considerably facilitates the manufacturing process, in particular the mastication, mixing, rolling, and the like, and the admixture of added pigments, filling materials, sulphur, gas black and the like, and in particular of heavy materials such as litharge, barytes, zinc white and other heavy metal compounds is better distributed (i. e. more uniformly incorporated) than was hitherto possible. The filling materials and the like have long been distributed through the rubber mixture upon the rolls in powder form. With this rolling process considerable difficulties were encountered and in most cases it was only with great difficulty that the filling materials were uniformly distributed in the whole mixture, since these additions mostly form agglomerates.

For this reason it has for some time been tried to add the powdered additions to the rubber mixture in the form of emulsions or suspensions. It has for a long time, however, proved extremely difficult to find suitable dispersion materials with the aid of which the heavy metal compounds and the like may be converted into stable emulsions. Albuminous bodies which might be suitable for this purpose coagulate easily, so that the emulsions obtained therewith flocculate very readily. In addition, the dispersion materials must produce no unfavorable effect upon rubber itself, particularly no depolymerizing or oxidizing action, in order not to influence unsatisfactorily the ageing characteristics of the rubber.

It has now been found that the vegetable phosphatide to be added to the rubber mixture is, according to the invention, preferably first mixed with the filling material and the like (such as barytes, litharge, zinc oxide, sulphur, carbon black and the like), and stirred to a watery emulsion which, it has been found, is very stable and may be mixed uniformly into the rubber mixture on the rolls prior to vulcanization without agglomerate formation and without disadvantageous action in the product.

The phosphatides may, however, also be added to the rubber mixture, according to the invention, are in concentrated form, while the filling materials are rolled in in the usual manner in powder form. The amount of phosphatides to be employed is controlled according to the nature of the rubber material to be employed, the filling and pigment material, the sulfur content and the desired properties and degree of vulcanization of the finished product. Preferably the proportion is 0.4% and above.

If the filling materials and the like are introduced in the form of an aqueous suspension or emulsion, then for example 1 kg. of soya phosphatide are intimately rubbed together with 9 litres of water. To this 5 kgs. of air-sifted zinc white are added in small portions and distributed in the mass by uniform stirring. These emulsions are distributed in the rubber mixture upon the rolls.

According to another embodiment of the invention, 1 kg. of soya phosphatide can be rubbed up in 5 litres of water and 5 kgs. of litharge added thereto. This produces a stable emulsion from which after 24 hours practically no separation has occurred. For the carrying out of the process according to the invention phosphatides of vegetable and animal sources can be employed, particularly soya phosphatide as is obtained in the extraction of soya beans.

It has also been found that for the process according to the invention not only pure yellow coloured phosphatide but also soya sludge as well as the waste and decomposition products resulting in the purification of phosphatides for nutrient purposes and the like and containing organic phosphorous compounds, which show a good emulsifying, softening and vulcanization-accelerating action, can be employed.

Phosphatides can, according to the invention, also be employed in combination with other vulcanization accelerators.

It has been found that the phosphatides also improve the ageing properties of the vulcanized material. Zinc oxide exerts an activating action on the vulcanization process. The vulcanization range is proportionately greater so that the possibility of over-curing is reduced.

I claim:—

1. Method of producing vulcanized rubber products comprising incorporating a phosphatide in a rubber mix and vulcanizing said rubber mix.

2. Method of producing vulcanized rubber goods consisting in incorporating a vegetable phosphatide in a rubber mix and vulcanizing said rubber mix.

3. Method of producing vulcanized rubber goods consisting in emulsifying an organic phosphorus compound selected from the herein described group consisting of vegetable phosphatides, animal phosphatides and partially decomposed phosphatides still retaining good emulsifying properties, softening properties and vulcanization-accelerating properties, with water and pulverulent solid rubber-compounding materials, incorporating said emulsion in a rubber mix and vulcanizing said mix.

4. Method of producing vulcanized rubber goods, consisting in emulsifying at least one organic phosphorus compound selected from the herein described group consisting of vegetable phosphatides, animal phosphatides and partially decomposed phosphatides still retaining good emulsifying properties, softening properties and vulcanization-accelerating properties, water, powdered sulphur and powdered filler, incorporating said emulsion with a rubber mix and vulcanizing said mix.

5. Method of producing vulcanized rubber goods, consisting in emulsifying at least one organic phosphorus compound selected from the herein described group consisting of vegetable phosphatides, animal phosphatides and partially decomposed phosphatides still retaining good emulsifying properties, softening properties and vulcanization-accelerating properties, water, sulphur, filler and a vulcanization accelerator, adding said emulsion to a rubber mix and vulcanizing said mix.

6. Method of producing vulcanized rubber goods consisting in intimately admixing an organic phosphorus compound selected from the herein described group consisting of vegetable phosphatides, animal phosphatides and partially decomposed phosphatides still retaining good emulsifying properties, softening properties and vulcanization-accelerating properties with water, intimately incorporating with said mixture finely divided sulphur and at least one filler in powdered form, adding said mixture to a rubber mix and vulcanizing said rubber mix.

7. Method of producing vulcanized rubber goods comprisng intimately admixing 1 part of vegetable phosphatide with approximately 9 parts of water, incorporating therewith approximately 5 parts of zinc white, emulsifying the mixture, incorporating said emulsion in a rubber mix and vulcanizing said mix.

8. Method of producing vulcanized rubber goods, consisting in intimately admixing 1 part of vegetable phosphatide with approximately 5 parts of water, incorporating therewith approximately 5 parts of litharge, emulsifying said mixture, incorporating said emulsified mixture with a rubber mix and vulcanizing said rubber mix.

9. Method of producing vulcanized rubber products comprising incorporating an organic phosphorus compound selected from the herein described group consisting of soya phosphatides, soya sludge, and the organic-phosphorus-containing by-products recovered in the purification of soya phosphatides, in a rubber mix and vulcanizing said rubber mix.

10. Method of producing vulcanized rubber goods consisting in incorporating soya phosphatide in a rubber mix and vulcanizing said rubber mix.

11. Method of producing vulcanized rubber goods, consisting in emulsifying soya phosphatide, water, powdered sulphur and powdered filler, incorporating said emulsion with a rubber mix and vulcanizing said mix.

12. Method of producing vulcanized rubber goods, consisting in emulsifying soya phosphatide, water, sulphur, filler and a vulcanization accelerator, adding said emulsion to a rubber mix and vulcanizing said mix.

13. Method of producing vulcanized rubber goods consisting in intimately admixing material containing soya phosphatide with water, intimately incorporating with said mixture finely divided sulphur and at least one filler in powdered form, adding said mixture to a rubber mix and vulcanizing said rubber mix.

14. Method of producing vulcanized rubber goods comprising intimately admixing 1 part of soya phosphatide with approximately 9 parts of water, incorporating therewith approximately 5 parts of zinc white, emulsifying the mixture, incorporating said emulsion in a rubber mix and vulcanizing said mix.

15. Method of producing vulcanized rubber goods, consisting in intimately admixing 1 part of soya phosphatide with approximately 5 parts of water, incorporating therewith approximately 5 parts of litharge, emulsifying said mixture, incorporating said emulsified mixture with a rubber mix and vulcanizing said rubber mix.

16. As a new product of manufacture a vulcanized rubber composition comprising at least one organic phosphorus compound selected from the herein described group consisting of vegetable phosphatides, animal phosphatides and partially decomposed phosphatides, incorporated prior to vulcanization.

17. As a new product of manufacture, vulcanized rubber compositions comprising at least one vegetable phosphatide incorporated prior to vulcanization.

18. As a new product of manufacture a vulcanized rubber composition comprising a product containing unrefined soya phosphatide incorporated prior to vulcanization.

19. As a new product of manufacture, vulcanized rubber compositions comprising phosphatide from soya bean incorporated prior to vulcanization.

BRUNO REWALD.